US00RE38065E

(19) United States
(12) Reissued Patent
Bravenec et al.

(10) Patent Number: US RE38,065 E
(45) Date of Reissued Patent: Apr. 8, 2003

(54) PRINTING PROCESS USING THIN SHEET LENTICULAR LENS MATERIAL

(75) Inventors: Daniel W. Bravenec, Castle Rock, CO (US); Gary W. Marsh, Kopperl, TX (US)

(73) Assignee: Lenticular Technologies, LLC, Irving, TX (US)

(21) Appl. No.: 09/828,248

(22) Filed: Apr. 6, 2001

Related U.S. Patent Documents

Reissue of:
(64) Patent No.: 5,967,032
Issued: Oct. 19, 1999
Appl. No.: 09/082,715
Filed: May 21, 1998

(51) Int. Cl.[7] ..... B61M 1/14
(52) U.S. Cl. ..... 101/211; 101/488; 355/22; 355/77; 359/463; 430/293; 430/946
(58) Field of Search ..... 101/211, 483, 101/488, 401.1, 170; 355/22, 77, 79; 359/463; 430/946, 293; 345/419; 347/2; 428/157

(56) References Cited

U.S. PATENT DOCUMENTS 4,309,496 A * 1/1982 Miller ..... 101/211
4,325,631 A * 4/1982 McCullion, Jr. ..... 101/211
4,814,826 A * 3/1989 Fritsch
4,903,069 A * 2/1990 Lam
4,935,335 A * 6/1990 Fotland
5,003,915 A * 4/1991 D'Amato
5,108,531 A * 4/1992 Quadracci ..... 101/488
5,266,995 A * 11/1993 Quadracci et al.
5,276,478 A * 1/1994 Morton
5,278,608 A * 1/1994 Tayor et al.
5,279,912 A * 1/1994 Telfer et al.
5,285,238 A * 2/1994 Quadracci et al.
5,302,989 A * 4/1994 Traguchi
5,424,553 A * 6/1995 Morton
RE35,029 E * 8/1995 Sandor et al.
5,457,515 A * 10/1995 Quadracci ..... 101/483
5,500,712 A * 3/1996 Miyawaki et al.
5,539,487 A * 7/1996 Taguchi et al.
5,543,965 A * 8/1996 Bielinski et al.
5,560,799 A * 10/1996 Jacobsen
5,600,402 A * 2/1997 Kainen
5,695,346 A * 12/1997 Sekiguchi et al.
5,729,332 A * 3/1998 Fogel ..... 355/77
5,753,344 A * 5/1998 Jacobsen
5,764,231 A * 6/1998 Ray et al. ..... 345/419
5,867,322 A * 2/1999 Morton ..... 355/77

* cited by examiner

*Primary Examiner*—Eugene Eickholt
(74) *Attorney, Agent, or Firm*—Polster, Lieder, Woodruff & Lucchesi, L.C.

(57) ABSTRACT

A process for printing an image ($I_C$) on a lenticular lens material (12) with a printing press (10). A separate film negative (B, C, Y, M) is prepared for each color used in printing the image. One of the negatives (B) is selected and each of the other negatives, and the lens material, is registered with the selected negative. Each of negatives is adjusted to the selected negative so all of the negatives and the lens material are in registry with each other. Separate printing plates (18) are prepared from each of the negatives. The plates are mounted on the press at respective printing stations and the lens material is run through the press with each of the plates being used to print on the material. The plates are adjusted, as necessary, to align the plates and register the color dot patterns printed by each plate to the color printed by the plate made from the selected negative. After the adjustment, the lens material is run through the press and printed with the resulting printed image displaying desired visual effects when viewed through lenticules (14) formed on the other side of the lens material from the side (16) on which the image is printed.

30 Claims, 4 Drawing Sheets

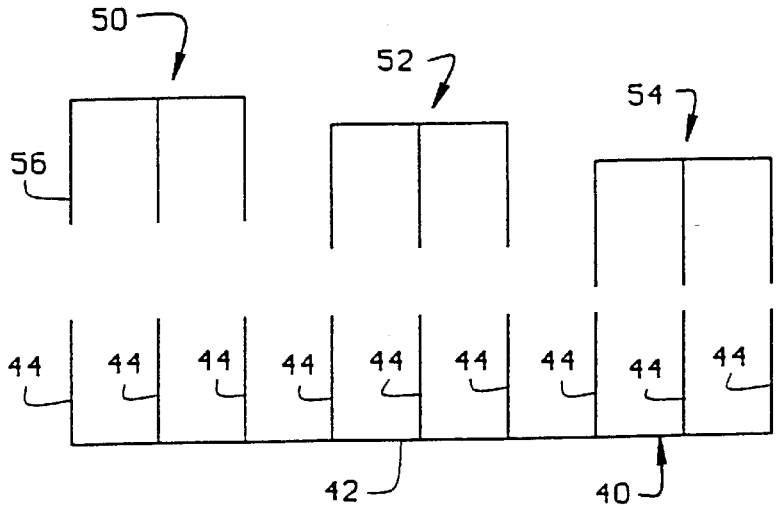
FIG. 9
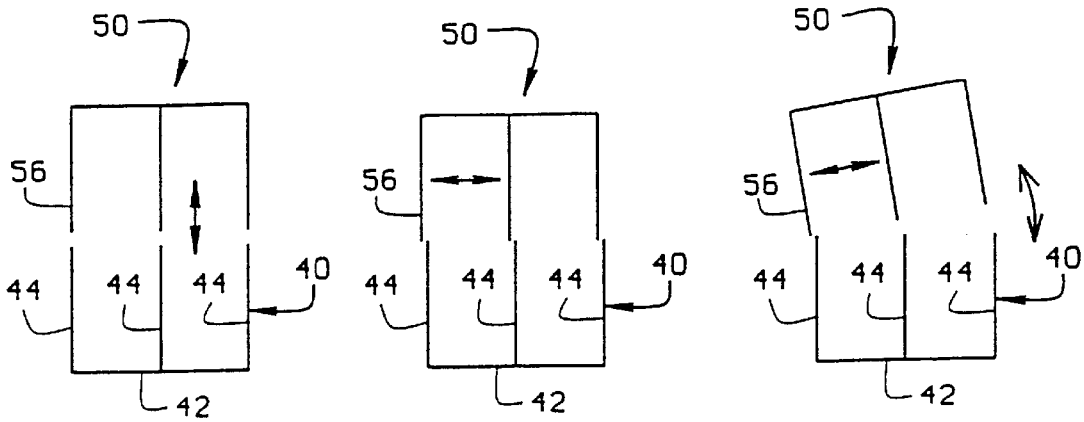
FIG. 10A
FIG. 10C
FIG. 10B

PRINTING PROCESS USING THIN SHEET LENTICULAR LENS MATERIAL

Matter enclosed in heavy brackets [ ] appears in the original patent but forms no part of this reissue specification; matter printed in italics indicates the additions made by reissue.

BACKGROUND OF THE INVENTION

This invention relates to printing processes involving lenticular lens material and, more particularly, to such a printing process in which a thin sheet lenticular lens material is used and in which high quality printing, with desired optical effects, is achieved.

Lenticular lenses are known and used in the printing industry primarily in the printing of advertising and promotional materials, packaging labels, hang tags for merchandise, product tags, and security labels. A preliminary step in a printing process includes selecting segments from two or more visual images used to create a desired visual effect and interlacing these segments. The interlaced segments are then mapped to a selected lenticular lens material in a prepress operation, so when the segments are printed on the material the final result exhibits a desired visual effect such as zoom-in, zoom-out, stereoscopic or 3-dimensional, and movement. The lenticular lens material used in this printing process includes a transparent web which is flat on one side with a plurality of lenticules being formed on the other side. The mapped images are printed directly onto the flat side of the lens material. The lenticules comprise convex lenses formed in a side-by-side arrangement with the lenticules extending parallel to each other the length of the web. Different lens materials have a different number of lenticules per inch (LPI) with the particular LPI selected depending upon the particular application. Once the image segments and material is selected, the previously noted prepress operation is performed with the image segments being mapped with respect to the focal points of the lenticules on the selected lens material.

The major cost component in a lenticular printing operation is the lens material. Heretofore, the lens material has typically been between 20–25 mils thick and the material cost has represented 50–75% of the total cost of a printing project. It is therefor beneficial to try to reduce the cost of the lenticular lens material, if this can be done without sacrificing the quality of the printed product. One way of reducing cost is to decrease the thickness of the lens material. However, doing so creates significant problems which must be overcome to produce a quality product. For example, even though sheet thickness is reduced, the LPI of the material is actually increased. This means that the width of each lenticule is narrower which, in turn, reduces the margin of error which is acceptable during printing. Factors such as temperature, humidity, uniformity of pressure exerted on the material as it is drawn through the printing press, all also have a greater impact on the quality of the printed material than with a conventional thicker lens material. Non-uniform pressure will cause a thin lens material to stretch, distorting the material and causing the printed pattern to no longer be aligned with the focal points of the individual lenses. Similarly, if the temperature and humidity to which the lens material is subjected is not maintained at a constant value, the material will again distort with an unacceptable result being produced.

Overall, and in accordance with the present invention, the quality of the printing operation has been found to be best controlled by meticulously controlling the alignment of the film, printing plates, and lens material prior to the start of printing. In addition, by controlling the pressure on the material as it is run through the press, the temperature and humidity in the area where the press is located, distortions which may occur during printing are further minimized or eliminated altogether. The printing process of the present invention overcome the numerous problems which must be addressed during press set-up and the subsequent printing operation so the result is a printed sheet of lenticular lens material which has the clarity and color delineation required to produce the visual effects desired by the customer.

BRIEF SUMMARY OF THE INVENTION

Among the several objects of the present invention may be noted the provision of a lenticular printing process employing a lenticular lens material substantially thinner than conventional lens materials, but which provides superior visual qualities for materials printed using the lens. In particular, the optical effects produced using the thin lens material with the process of the present invention are comparable to, if not significantly better than, those achievable using lenticular lens material of a conventional thickness, but achievable at substantially less cost.

Another object of the invention is a printing process in which alignment and registration of the colors to be printed are done not only to each other prior to printing, but also to the lens material. That is, during press set-up, the film negative for each of the four process colors (black, cyan, magenta, and yellow) are registered to one another; and in addition, to the focal points of the lenticules in the lens material. By proper alignment and registration of the negatives to each other and the lens material, total deviation from perfect registration can be controlled to less than one-half of one lenticule; this despite the fact that the width of the lenticules are substantially less than that of lenticules on conventional lens materials.

Another object of the invention is a printing method in which perfect squareness of the film to the printing plates and printing plates to the lens material is achieved. That is, the film is first stripped so the negatives are perfectly square or in registry with each other. The printing plates are next adjusted and mounted to be perfect square. Finally, the lens material is set-up to be and is maintained perfectly square through the printing process. Apparatus used in the set-up portion of the process is provided to achieve an exacting level of alignment and dot pattern registration throughout the printing process.

A still further object of the invention is a printing process by which substantially more phases (interlaced segments subtended by a lenticule) are accommodated than has previously been possible. Up to fifty percent more phases are acceptable with the thin lens material used in the process despite the fact the material is only between one-half and three-quarters the thickness of conventional materials and has substantially more lenticules per inch.

Yet another object of the invention is a printing process usable with different types of printing processes such as flexographic and lithographic printing, to produce an acceptable lenticular product regardless of the process employed. Regardless of the type of press used, the process of the present invention, and the associated apparatus, reduces the cost of a printing job by insuring that precision alignment and color registration is made between the film, plate and lens material prior to the start of a printing operation. This reduces the amount of film otherwise wasted during set-up as well as the run time for the job. Further, by acclimatizing the film to the press both before and during a run, effects of temperature, humidity, and pressure are also minimized. By using the lenticular lens material in the order in which it was produced, effects caused by any variations from one portion of a lot to the next are also minimized.

Finally, it is an object of the present invention to provide a printed product in which all segments of respective interlaced images are sharp and clear and in which desired visual effects incorporated into the final product are readily observed.

In accordance with the invention, generally stated, a lenticular lens material used in a printing process comprises a web of transparent material of a predetermined thickness, this thickness being between one-half and three quarters the thickness of conventional lenticular lens materials. In a prepress operation, interlaced image segments which produce a desired visual effect in a final printed product are mapped to the selected lens material. As an initial step in the printing process the film negatives are aligned with each other and the focal points of the lenticules on the lens material so the color dot patterns which are to be printed on the lens material properly register with each other. This is done both for the film negatives for each image color, and the printing plates made from the negatives. The negatives, plates, and lens material are adjusted, as necessary, at each stage prior to an actual print run. A special grid is used with the negatives and the plates installed on the press for this purpose, and registration control marks (combs) printed on the material by each color plate are used for final adjustment. Prior to beginning of a printing process, the lens material is acclimatized to the press to insure that the temperature level of sheets of lenticular lens material run through the press have a temperature corresponding to that of the impression and transfer cylinders used in the press. During printing, the selected lens material is run in lot, cylinder ID, and skid number sequence. The meticulous prerun set-up and environmental control of the press and its surrounding area results in a consistent registration of the dots printed on a flat side of the lens material to the lenticules formed on the opposite side thereof, so to produce a printed lenticular product with desired visual effects of a superior clarity. Other objects and features will be in part apparent and in part pointed and hereinafter.

BRIEF DESCRIPTION OF THE SEVERAL VIEWS OF THE DRAWINGS

In the drawings:

FIGS. 3A–3C are elevational views of sheets of lenticular lens material wherein FIG. 3A illustrates a prior art material, and FIGS. 3B and 3C respective thin lens materials usable in the process of the present invention;

FIG. 9 illustrates combs formed on each of the other color negatives and the registry of these combs to the comb formed from printing the selected color; and, FIGS. 10–10C illustrate how the combs are used to check alignment of the plates used to print the other colors to the plate used to print the selected color.

Corresponding reference characters indicate corresponding parts throughout the drawings.

DETAILED DESCRIPTION OF THE INVENTION

Figure 1:
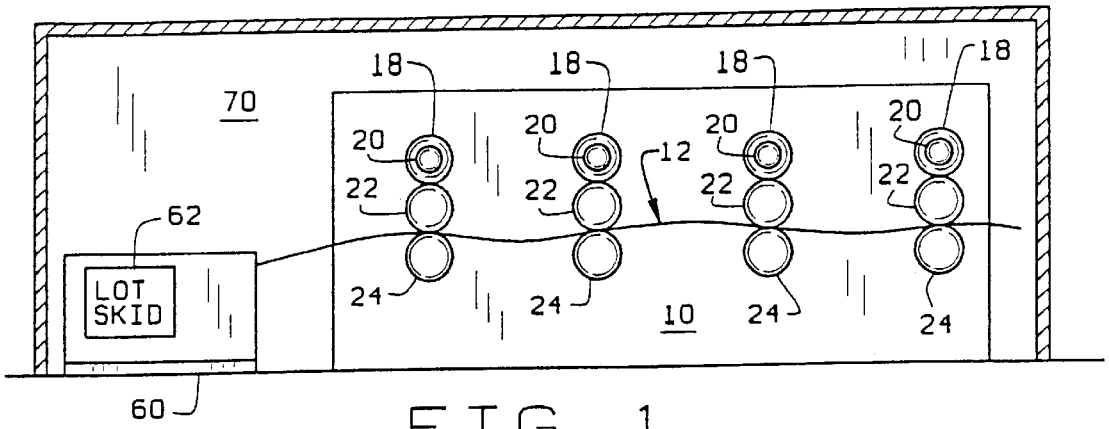
FIG. 1 is a simplified representation of a printing press for printing interlaced image segments on a sheet of lenticular lens material to produce a desired visual effect.
Figure 2:
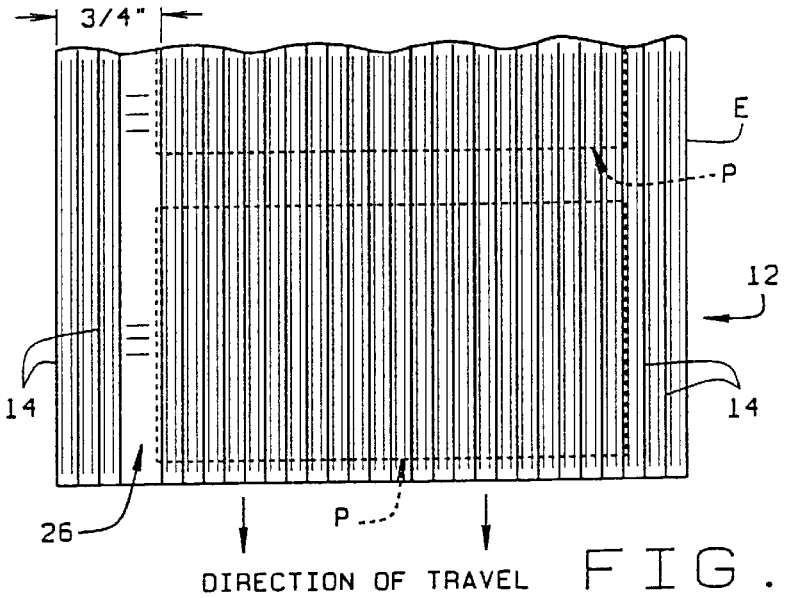
FIG. 2 is a plan view of the lenticule side of a sheet of lenticular lens material showing an alignment guide formed on the sheet along one side of the sheet.
Figures 3A, 3B, 3C:
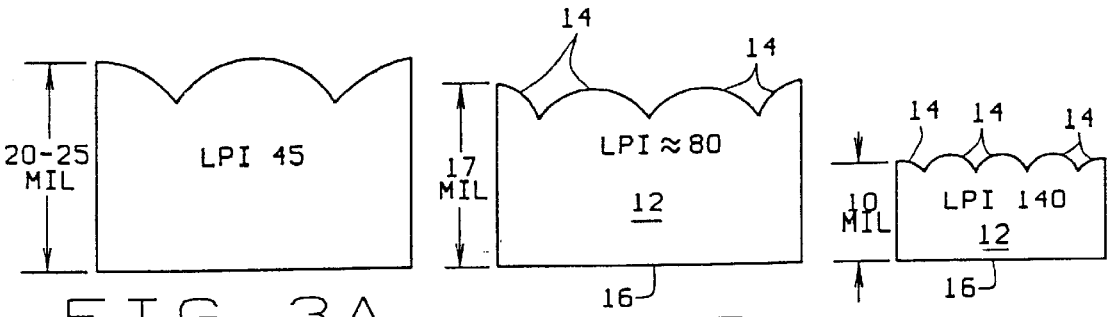
FIG. 3A PRIOR ART FIG. 3B FIG. 3C
Figure 4:
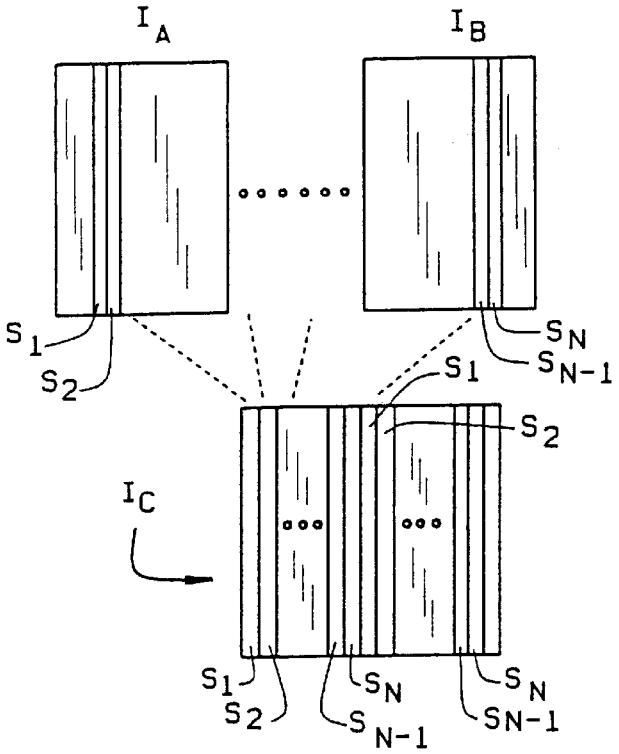
FIG. 4 is a simplified illustration of how a composite image to be printed on the lenticular material is derived by interlacing image segments taken from selected images.
Figure 8:
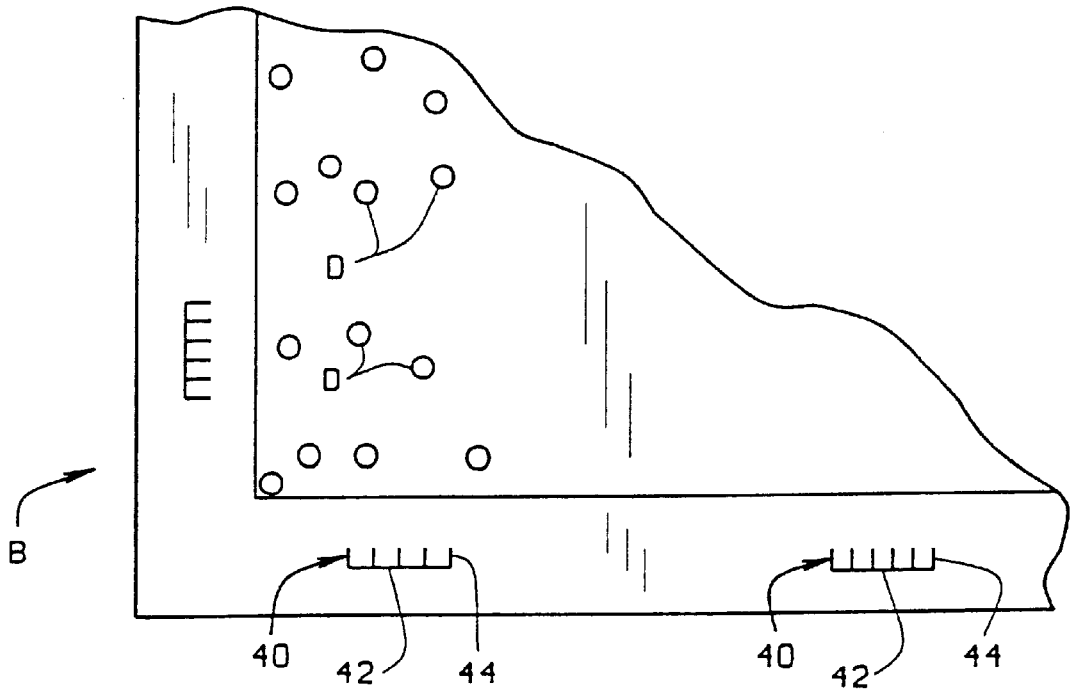
FIG. 8 is a partial plan view of a negative for a selected (black) color used in printing with a series of registration control marks (combs) formed at intervals along the margins of the film for alignment and registration purposes.

Referring to the drawings, a printing press indicated generally 10 in FIG. 1 is used to print a web 12 of lenticular lens material fed into the press from one end thereof. As shown in FIGS. 2, 3A, and 3B, the lenticular lens material has a plurality of lenticules 14 formed on one side of the material and extending lengthwise of the material. The other side 16 of the web is flat. The images printed on the lenticular material are printed on the flat side of the material and viewed through the lenticules 14. As is known in the art, in a lenticular process, segments are selected from plurality of images. In FIG. 4, segments S are selected from images $I_A$–$I_B$. The segments are then interlaced together to form a composited image $I_C$ having segments (or phases) $S_1$–$S_n$. The sequence of segments is repeatable across the composite image; or, the sequence has only a single repetition. The composite image is then mapped to a chosen sheet of lenticular material in a prepress operation. Color separation is performed as part of the prepress operation and a separate negative is made for each of the four basic colors (black, yellow, cyan, magenta) used in a printing operation. If special colors are employed, a separate negative is produced for each of those colors as well. Printing plates 18 are burned from the negatives and the plates are fitted to rollers 20 at appropriate stations on the press for a separate color to be printed at each station. A blanket roller 22 rotates with roller 20, and as the rollers rotate, an edge E of web 12 is gripped by the rollers for the web of lenticular material to be "pulled" through the printer. As web 12 advances between a blanket roller 22 and an impression roller 24, dots D (see FIG. 8) of the color associated with that print station is printed on flat side 16 of the web. At the end of the press run, the printed web of material is cut into sheets of a desired length and width and these sheets are used in producing the final product. It will be appreciated by those skilled in the art that the foregoing description is exemplary only, and that other printing methods can be employed without departing from the scope of the invention.

Various visual effects are achievable by printing on a lenticular material. Among these effects are "flips". "3-D" or stereographic, full motion video, "morphing", and zooming. A "flip" represents an abrupt change from one viewed image to another, different image. Using a lens 14 with the process of the present invention, between 2–4 "flips" can be made as the lens is viewed from different angles, "3-D" effects produce an illusion of depth for an object being viewed. Full motion video produces a sense of movement of an object being viewed as the viewing angle changes. "Morphing"

produces an illusion of a metamorphosis (transition) from one image to another as the viewing angle changes. Zooming presents a size change in an object being viewed, the object appearing to move either closer to, or away from, the viewer.

As shown in FIGS. 3A–3C, a web 12 of lenticular lens material is substantially thinner than a web of conventional lens material; e.g., from approximately three-quarters (FIG. 3B) to one half (FIG. 3C) of the thickness. Whereas conventional lens material is approximately 20–25 mils thick (FIG. 3A), web 12 is approximately 17 mils thick (FIG. 3B) to 10 mils thick (FIG. 3C). Further, web 12 has a substantially higher LPI than conventional lens materials. Whereas the conventional lens material of FIG. 3A has, for example, a LPI of 45, the web 12 shown in FIG. 3B has a LPI of approximately 80, and the web 12 of FIG. 3C, a LPI of 140. For a 40 inch wide strip of lens material with a LPI of approximately 80, each lens 14 has a width of approximately 5 mils. It is a feature of the present invention that the maximum allowable deviation for the entire process is one-half lenticule (2 ½ mils); but with the process of the present invention, the actual deviation is substantially less than this. A significant advantage with using the thin lens material, besides a lower material cost, is the ability to enhance the visual effects produced with the material. With conventional lens materials, the maximum number of phases or interlaced image segments printed subtended by one lenticule is 18. With the thin lens lenticular material described herein, the number of phases can be increased to between 28–32. This allows the product designer more flexibility in the effects he or she wants to achieve.

Figure 5:
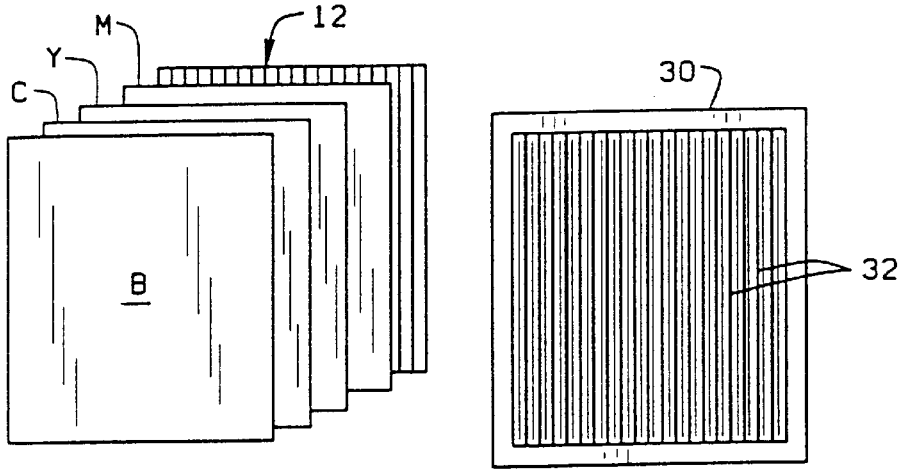
FIG. 5 is a plan view of an alignment grid used with the respective negatives for the colors to be printed and the lens material used in the printing.
Figure 6:
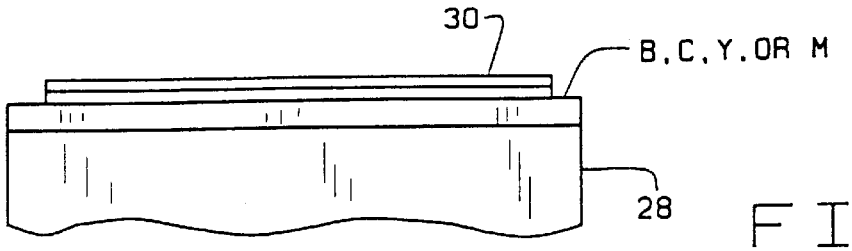
FIG. 6 illustrates a light table on which a negative or the lens material is placed and over which the alignment grid is set in order to align the negatives and the lens material with each other.
Figure 7:
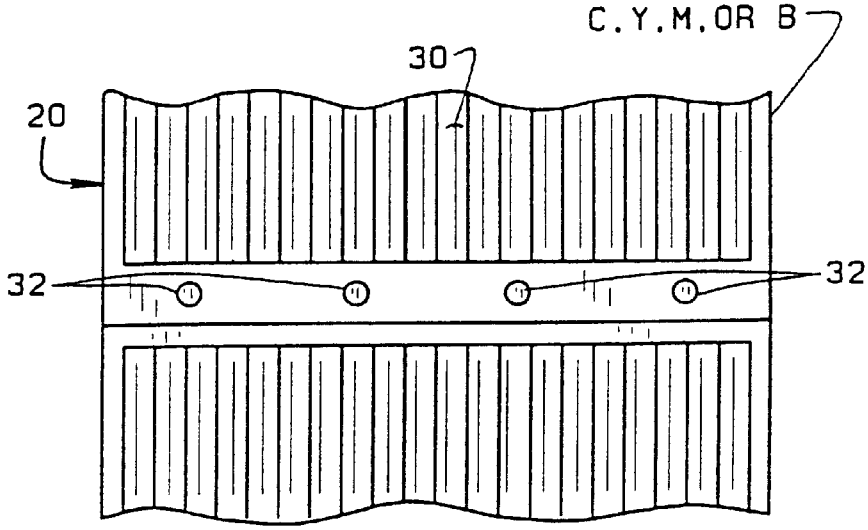
FIG. 7 represents a printing press roller with the alignment grid placed over a negative attached to the roller by a pin system thereof for aligning the negative when mounted on the roller.

In accordance with the invention, once mapping of the interlaced segments to the lenticular lens material is completed, the resulting proofs and press film are inspected to determine the correctness of the lenticular animation medium. Overall color correctness and balance are also verified at this time, and the film is checked for scratches and pin holes. Assuming that after these checks, everything is acceptable, a selected reference negative, for example, black negative B (see FIG. 5) is placed on a stripping table and each of the other color negatives C, Y, and M is placed, one at a time, over black negative B. For each of these negatives the color's fit to black is checked. This is done using register control marks and flash bands incorporated on the film. Further, it is an important feature of the invention that in addition to checking each of the color negatives to the reference (black) negative, a strip of the selected lenticular lens material 12 is also registered to this negative. This further check insures that all of the elements used in printing the final product register with each other and that there are no inconsistencies in this regard. Also importantly, and as shown in FIG. 2, the lenticular lens material used in the printing process has an alignment reference or guide formed on the material itself. As shown on the left side of the strip in FIG. 2, the strip is formed with one of the lenticules missing so to form a flat surface segment 26. The position of the alignment guide is, for example, ¾" in from the left side of the strip and is used in aligning the lenticular material with both the negatives and the printing plates. Segment 26 extends along the one side of the lens material, but outside the area of printing on the flat side 16 of the material, so provision of the alignment segment does not effect the results of the printing operation. In FIG. 2, areas on the flat surface of the lens material on whether on which image $I_C$ is printed are indicated generally P. After printing is completed, the lens material, as noted above, is cut into individual sheets on each of which image $I_C$ is printed, and at the time the section of lenticular material having the alignment segment is trimmed away and discarded.

Next, each negative is separately placed on a light table 28, emulsion side up. A film grid 30 is placed over the negative and any air pockets between the two pieces of film are pressed out so the negative and film grid are in direct contact with each other over their facing surfaces. Grid 30 is formed on a rectangular strip of film and comprises spaced grid lines 32 extending parallel to each other across the film and extending lengthwise of the film. The spacing between these grid lines corresponds to the width of two lenticules (measured from focal point to focal point) on the lenticular lens material 12 being used. With grid 30 in place, the pattern of dots D should appear between adjacent grid lines and this pattern is examined for consistency from side-to-side and along the entire length of the negative. If inconsistencies are found, the film is replaced. It will be understood that a different grid 30 is used with each different lens material depending upon the LPI of the material.

After the film has been inspected and each of the negatives C, Y, and M, and the lens material 12 has been registered to the black negative B, each of the negatives are mounted on their respective rollers 20 and stripped to be both straight and square to gripper edge register pins 32 on roller 20. The grid 30 is also used in this procedure, again to insure that each negative is properly aligned. This is done by placing grid 30 over the respective negative, as it is installed on the roller, and adjusting the negative as necessary until proper straightness and squareness are achieved. Once the negatives are properly registered on the rollers, the plates 18 made from the respective negatives are mounted are mounted on the rollers 20 and the registration process is repeated, again using grid 30.

After this printing plates are aligned and registered, a length of the web of lenticular lens material is pulled through the printer. At this time, only the selected reference (black) color is printed. The section of printed material is now checked for alignment. This is done, for example, by folding the sheet in half lengthwise and examining register control marks 40 on opposite corners of the sheet. As shown in FIG. 8, and FIGS. 9–10C, a register control mark 40 comprises a comb printed along the sides and ends of the sheet at spaced intervals. That is, each comb comprises a printed line 42 printed along each side and end of each sheet and spaced outwardly from the interlaced material printed on each sheet. The lines printed along the respective sides of each sheet extended parallel to the longitudinal axis of the web of material, and a series of spaced lines 44 extend inwardly from line 42 orthogonal to the longitudinal axis of the web. With respect to the lines pointed on the ends of each sheet, the line orientation is reversed. The register control marks 40 printed along the sides of the sheet extend parallel to gripper edge E of the sheet. If the marks 40 do not register; that is, the marks 40 on one side of the sheet do not perfectly overlay the corresponding marks 40 on the opposite side of the sheet, the plate is adjusted and another length of material is printed and alignment is again checked.

After alignment and registration to black is accomplished another of the colors, cyan for example, is printed together with the black. Now, this combination of colors is checked for alignment and registration. In addition to the registration controls marks 40 printed on each sheet by the black color plate, a separate comb 50 is printed on each sheet by the cyan color plate. Similarly, and as shown in FIG. 9, a comb 52 is printed from the magenta plate, and a comb 54 from the yellow plate. Each comb is shorter in length than comb 40, and the combs printed by each of the cyan, magenta, and yellow plates subtends a separate section of registration control mark 40. Thus, as shown in FIG. 9, comb 50 subtends one end portion of comb 40, comb 52 a middle portion, and comb 54 the other end portion. To check the alignment and registration of the cyan printing, the comb marks of comb 50 are checked with respect to comb 40. FIGS. 10A–10C indicate that there are six different alignment checks. In to out is checked, as shown in FIG. 10A, by determining if the inner end of the comb lines 56 touch the outer end of comb lines 42. If they do, then the colors align. If the ends of the respective lines are spaced apart from each other, or if they overlap, then an adjustment needs to be made. In FIG. 10B, if the lines 42 and 56 are to one side or the other of each other, this also signifies that an adjustment needs to be made. If the comb 52 is rotated in either direction with respect to comb 40, as shown in FIG. 10C, this further indicates the need for adjustment to achieve alignment.

Each color is separately checked and if an adjustment is necessary, it is made for each separate plate. When the process is completed, each color is now aligned and registered to the black. Another run is then made with all colors being printed and another check is made to verify that all the colors are now aligned and registered to the black. If they are not, further adjustment are made before the actual print run is commenced.

In addition to the registration and alignment steps described above, other process steps are implemented in accordance with the invention to insure the quality of the print result. One step is that all the lens material used in the printing job is used in lot and skid number sequence. As shown in FIG. 1, the lenticular material 12 is carried on a pallet 60. For a given printing job, more than one pallet of material may be required. Each pallet includes a label or tag 62 which includes both the lot and skid number for the material on the pallet. It will be understood that the lenticular material is made as a continuous web which is then cut to size for each pallet. By requiring that the material be used in the same sequence in which it is manufactured, any minor imperfections which may appear in the lens material is more readily accommodated for during the print run. That is, if there are imperfection, it usually becomes apparent as more lens material is produced during manufacturing. During a printing job, if the skids are taken out of their manufacturing sequence, any imperfections which may be in the lens material will require greater adjustment to maintain alignment and registry of the colors being printed than if the skids are used in their proper sequence. Further, use of the skids in the proper sequence allows the printer to generally know in which direction an adjustment will need to be made in going from one skid to the next. Using the skids in a random sequence may, on the other hand, require an adjustment in one direction for one skid, the opposite direction for the next skid, and so forth. This increase both the time and cost of a print job and tends to lower the overall quality of the result.

Finally, it is important that the printing area be environmentally controlled. Most often, pallets of lenticular material are stored in one area, and printed in another. The temperature and humidity in one locale can be significantly different from the other. As the temperature gets colder, the pliability of the lens material decreases and the material contracts in size. By contrast, the material becomes more pliable as it gets warmer and the material tends to expand in size. Humidity and area lighting also effect the physical properties of the material. For maintaining a high quality lenticular product, it is important, in accordance with the invention, to establish and maintain both the printing area, and any staging area for pallets 60 to be used in the job both areas indicated generally 70 in FIG. 1) within the same environment. A sheet surface temperature ranging, for example, between 72°–80° F. (22°–27° C.) has been found to provide the best results. With respect to skids which are kept in storage area, it is important that they be moved into the staging area sufficiently in advance of their use that the material temperature has stabilized within the desired range throughout the pallet before the material is used for printing.

What has been described is a lenticular printing process employing a lenticular lens material substantially thinner than conventional lens materials, but which provides superior visual qualities for images printed on the lens material. Optical effects produced using the lens material and process of the present invention, also produce the desired visual effects achieved at substantially less cost. The alignment and color registration process of the invention insures that all of the colors are matched to each other and the lens material so to provide superior results in the final printed product. By paying particular attention to the press set-up, prior to actually printing on the lens material, the resulting images have a sharpness and clarity not obtainable with conventional lenticular processes. Total deviation from perfect registration can be controlled to less than one-half of one lenticule, even though the lens material is 50–75% as thick as conventional material and the lenticule width is on the order of 5 mils.

The printing setup process described herein can be used with flexographic and lithographic printing processes with a significant reduction in the cost of a printing job not only because the material costs are reduced but also because the time spent to properly setup the press for printing reduces subsequent down time for adjustments and material waste. Also, by acclimatizing the film to the press both before and during a run, effects of temperature, humidity, and pressure are minimized. Also, uses of the lenticular lens material in a proper sequence minimizes the effects of variations from one portion of a lot to the next.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

We claim:

1. A process for printing an image on a lenticular lens material using a printing press, there being a separate film negative prepared for each color used in printing the image, the process comprising:

preparing separate printing plates from each of the negatives;

selecting one of the negatives and aligning each of the other negatives, and the lens material, with the selected negative;

adjusting each of the negative to the selected negative so a dot color pattern producible from each of the negatives register with each other and to the lens material;

mounting each of said plates on said press at respective printing stations;

adjusting the plates, as necessary, to register the color printed by each of the plates to the color printed by the plate made from the selected negative;

printing the respective colors onto the lens material by running the lens material through the press and printing on the material using each of the plates with the resulting printed image displaying desired visual effects when viewed through the lens material; and, climatizing the lenticular lens material to the printing press prior to running the lens material through the press during the printing.

2. The process of claim 1 wherein the lens material is sorted by manufacturing lot and a sequence in which the material is manufactured, and the process further includes printing on the lens material by lot and sequence of manufacturing so any imperfections which the material may have can be readily compensated for during printing.

3. A process for printing an image on a lenticular lens material using a printing press, there being a separate film negative prepared for each color used in printing of the image, the process comprising:

selecting one of the negatives and aligning each of the other negatives, and the lens material, with the selected negative;

adjusting each of the negative to the selected negative so a dot color pattern producible from each of the negatives register with each other and the lens material; and printing the respective colors onto the lens material with the resulting printed image displaying desired visual effects when viewed through the lens material, wherein the lens material has a thickness of approximately 10–17 mils and a LPI of approximately 80–140.

4. In a printing process for printing an image on a lenticular lens material, a separate film negative being prepared for each color used in printing the image and separate printing plates being prepared from each negative, each of the negatives and the lens material being aligned with a selected one of the negatives and adjusted thereto so a dot color pattern producible from each of the negatives register with each other and to the lens material, each of the plates being mounted on a printing press at respective printing stations, and adjusted, as necessary, to register the color printed by each plate to the color printed by the plate made from the selected negative, the improvement comprising;

mapping interlaced image segments comprising the image to the lens material in a prepress operation to register the image segments to lenticules of the lens material, adjusting each of the negatives and the lens material to the selected negative including registering color dot patterns on each of the negatives to the selected negative;

using a lenticular lens material having a thickness of approximately 10–17 mils and a LPI of approximately 80–140, and climatizing the lens material to the printing press prior to running the lens material through the press; and, printing the respective colors onto the lens material as the lens material runs therethrough using each of the plates, the resulting printed image displaying desired visual effects when viewed through the lens material.

5. A process for printing an image on a lenticular lens material using a printing press, there being a separate film negative prepared for each color used in printing the image, the process comprising:

selecting one of the negatives and aligning each of the other negatives, and the lens material, with the selected negative;

adjusting each of the negatives to the selected negative so a dot color pattern producible from each of the negatives register with each other and to the lens material, the image comprising interlaced image segments mapped to the lenticular lens material in a prepress operation to register the image segments to each lenticule of the lens material, and adjusting each of the negatives and the lens material to the selected negative involves registering color dot patterns on each of the negatives to the selected negative to produce a uniform result throughout the printed lens material; and printing the respective colors onto the lens material with the resulting printed image displaying desired visual effects when viewed through the lens material.

6. The process of claim 5 further including preparing separate printing plates from each of the negatives.

7. The process of claim 6 further including:

mounting each of said plates on said press at respective printing stations;

running the lens material through the press and printing on the material using each of the plates; and, adjusting the plates, as necessary, to register the color printed by each of the plates to the color printed by the plate made from the selected negative.

8. The process of claim 5 wherein the selective negative is placed on a stripping table and each of the other color negatives is placed, one at a time, over the selected negative and a color fit is checked for each of the other negatives to the selected negative using register control marks and flash bands on the negatives.

9. The process of claim 8 wherein registering the negatives to the lens material includes aligning the negatives with a reference formed on the material.

10. The process of claim 9 wherein said material has a flat segment formed on the lenticule side of the material and usable as a guide in aligning the lens material with the negatives.

11. The process of claim 10 wherein adjusting the negatives further includes:

separately placing each negative on a light table;

placing a film grid over the negative; and examining a pattern of dots which is formed between adjacent grid lines on the grid for consistency of the dot pattern from side-to-side, and along the length of the negative.

12. The process of claim 11 wherein said grid comprises a strip of film having spaced grid lines extending parallel to each other across the film and extending lengthwise of the film.

13. The process of claim 12 wherein said grid lines correspond to the width of two lenticules, measured from focal point to focal point, on the lenticular lens material being used.

14. The process of claim 11 further including mounting each of the negatives on separate printing press rollers and stripping each negative to be both straight and square to gripper edge register pins on the respective rollers.

15. The process of claim 14 wherein stripping said negatives includes placing said film grid over each respective negative, after the negative is installed on its associated roller, and adjusting the negative, as necessary, until the negative is aligned straight and square with the grid.

16. The process of claim 14 further including:

pulling a length of the lens material is through the printer;

printing a color on the material using only the plate for the selected negative; and, checking the printed length of material for alignment and for registration of the dot pattern for the color.

17. The process of claim 16 wherein register control marks are printed on the lens material and the alignment includes folding a sheet of the material in half, lengthwise of the sheet of material, and examining register control marks printed on opposite corners of the sheet.

18. The process of claim 17 wherein the register control marks comprise separate combs printed along the sides and ends of each sheet at spaced intervals, each comb comprising a printed line printed along each side and end of said sheet and spaced outwardly from the interlaced material printed on said sheet, lines printed along the respective sides of said sheet extending parallel to the longitudinal axis of said sheet and the lines printed along the respective edges of the sheet being orthogonal to said longitudinal axis, and each comb further including a series of spaced lines extending inwardly into said sheet from the first said line orthogonal to said first said line.

19. The process of claim 18 wherein register control marks pointed along the sides of a sheet extend parallel to a gripper edge of said sheet.

20. The process of claim 17 further including:

successively pulling lengths of the lens material;

printing on the material the color producible by the one said plate and another color producible by another of the plates; and, checking the length of printed material for alignment and for registration of the dot patterns for the two colors.

21. The process of claim 20 wherein a second registration control mark is printed on each sheet of the printed material by the plate for the other color, said second registration control mark being printed adjacent the first said registration control mark, said second registration control mark being compared with the first said registration control mark to determine if the dot patterns of the printed color properly align and register each other.

22. The process of claim 21 wherein separate registration control marks are printed on said material by the plates for each of the colors used in printing the image, each registration control mark comprising a comb separately comparable to the comb comprising the first said registration control mark to determine alignment and registration thereof.

23. The process of claim 22 wherein each of the other combs is shorter in length than the comb forming the first said registration control mark and each other comb subtends a separate section of the first said registration control mark.

24. The process of claim 23 wherein four colors are used in printing the image and one of the other said combs subtends one end portion of the comb forming the first said registration control mark, a second of the other combs subtends a middle portion of the comb forming the first said registration control mark, and a third of the other combs subtends the other end portion of the comb forming the first said registration control mark.

25. The process of claim 5 wherein climatizing the lens material to the printing press includes controlling the temperature, humidity, and lighting effects in the area of the press and any staging area where the lens material is kept prior to use.

26. The process of claim 25 wherein controlling the temperature of the lens material includes controlling the surface temperature of the lens material to a temperature between 72°–80° F.

*27. A process for printing an image on a lenticular lens material using a printing press, there being a separate printing plate for each color used in printing the image, the process comprising:*

*preparing a separate printing plate for each color to be printed;*

*selecting one of the plates and aligning each of the other plates, and the lens material, with the selected plate;*

*adjusting each of the other plates to the selected plate so a dot color pattern producible from each of the plates registers with each other and to the lens material;*

*mounting each of said plates on said press at respective printing stations;*

*printing the respective colors onto the lens material by running the lens material through the press and printing on the material using each of the plates with the resulting printed image displaying desired visual effects when viewed through the lens material; and*

*climatizing the lenticular lens material to the printing press prior to running the lens material through the press during the printing.*

*28. A process for printing an image on a lenticular lens material using a printing press, there being a separate printing plate for each color used in printing the image, the process comprising:*

*selecting one of the plates and aligning each of the other plates, and the lens material, with the selected plate;*

*adjusting each of the other plates to the selected plate so a dot color pattern producible from each of the plates registers with each other and to the lens material; and*

*printing the respective colors onto the lens material by running the lens material through the press and printing on the material using each of the plates with the resulting printed image displaying desired visual effects when viewed through the lens material, wherein the lens material has a thickness of approximately 10-17 mils and a LPI of approximately 80-140.*

*29. In a printing process for printing an image on a lenticular lens material, a separate plate being prepared for each color used in printing the image, each of the plates and the lens material being aligned with a selected one of the plates and adjusted thereto so a dot color pattern producible from each of the plates registers with each other and to the lens material, each of the plates being mounted on a printing press at respective printing stations, and adjusted as necessary, to register the color printed by each plate to the color printed by the selected plate, the improvement comprising:*

*mapping interlaced image segments comprising the image to the lens material in a prepress operation to register the image segments to lenticules of the lens material, adjusting each of the plates including registering color dot patterns on each of the plates to the selected plate;*

*using a lenticular lens material having a thickness of approximately 10-17 mils and a LPI of approximately 80-140, and climatizing the lens material to the printing press prior to running the lens material through the printing press; and*

*printing the respective colors onto the lens material as the lens material runs therethrough using each of the plates, the resulting printed image displaying desired visual effects when viewed through the lens material.*

*30. A process for printing an image on a lenticular lens material using a printing press, there being a separate plate prepared for each color used in printing the image, the process comprising*

*selecting one of the other plates and aligning each of the plates, and the lens mateial, with the selected plate;*

*adjusting each of the plates to the selected plate so a dot color pattern producible from each of the plates registers with each other and to the lens material, the image comprising interlaced image segments mapped to the lenticular lens material in a prepress operation to register the image segments to each lenticule of the lens material, and adjusting each of the plates and the lens material to the selected plate involves registering color dot patterns on each of the plates to the selected plate to produce a uniform result throughout the printed lens material; and,*

*printing the respective colors onto the lens material with the resulting printed image displaying desired visual effects when viewed through the lens material.*

* * * * *